(12) United States Patent
Sullivan et al.

(10) Patent No.: US 7,877,172 B2
(45) Date of Patent: *Jan. 25, 2011

(54) PIT ROAD DISPLAY

(76) Inventors: John Timothy Sullivan, 11339 Barley Field Way, Marriottsville, MD (US) 21104; Steve Parks, 1100 Wilson Dr., Baltimore, MD (US) 21223

( * ) Notice: Subject to any disclaimer, the term of this patent is extended or adjusted under 35 U.S.C. 154(b) by 0 days.

This patent is subject to a terminal disclaimer.

(21) Appl. No.: 12/511,630

(22) Filed: Jul. 29, 2009

(65) Prior Publication Data
US 2009/0287372 A1 Nov. 19, 2009

Related U.S. Application Data

(62) Division of application No. 12/216,933, filed on Jul. 14, 2008.

(60) Provisional application No. 61/064,662, filed on Mar. 19, 2008.

(51) Int. Cl.
*B60Q 1/00* (2006.01)
(52) U.S. Cl. .............................. 701/1; 701/36; 340/441
(58) Field of Classification Search .................. None
See application file for complete search history.

(56) References Cited

U.S. PATENT DOCUMENTS

| 4,095,553 A | 6/1978 | Ono et al. |
| 4,308,527 A | 12/1981 | Moreau et al. |
| 4,631,513 A | 12/1986 | Teshima et al. |
| 4,633,803 A | 1/1987 | Flowers |
| 4,647,901 A | 3/1987 | Teshima et al. |
| 4,787,039 A | 11/1988 | Murata |
| 4,788,539 A | 11/1988 | Frey |
| 5,422,625 A | 6/1995 | Sakaemura |
| 5,554,970 A | 9/1996 | Mottahedeh |

(Continued)

OTHER PUBLICATIONS

U.S. Appl. No. 12/426,614, filed Apr. 20, 2009 (allowed).

(Continued)

*Primary Examiner*—Michael J. Zanelli
(74) *Attorney, Agent, or Firm*—Bacon & Thomas, PLLC

(57) ABSTRACT

Instruments or gauges arranged to provide feedback detectable by the peripheral vision of a driver when vehicle operating parameters, such as engine speed, temperature, pressure, and voltage, are in a critical range, include one or more of the following types of instruments or gauges and/or features: (a) a tachometer that not only includes a primary numeric display, but also a secondary display made up of a plurality of discrete lights of different colors, the colors indicating whether the engine speed of a vehicle is within a relatively narrow range of engine speeds acceptable for the roadway leading from a race track to service areas, known as "pit road," the high and low limits of the range being adjustable to meet pit road requirements at different tracks; (b) an instrument or gauge having a background that illuminates to indicate critical sensor readings; (c) an instrument or gauge having improved handling of sensor abnormalities to prevent false readings; (d) a non-linear analog gauge for a motor vehicle having a higher resolution in a particular range of interest, and a lower resolution outside that range; and (e) a boost pressure gauge that facilitates entry of gear information for use in traction control. The instruments or gauges of the invention are suitable for use in racing vehicles that meet standards established by NASCAR.

4 Claims, 4 Drawing Sheets

U.S. PATENT DOCUMENTS

| | | |
|---|---|---|
| 5,815,072 A | 9/1998 | Yamanaka et al. |
| 5,880,710 A | 3/1999 | Jaberi et al. |
| 6,037,862 A | 3/2000 | Ying |
| 6,125,320 A | 9/2000 | Hellmann et al. |
| 6,137,399 A * | 10/2000 | Westberg et al. ............ 340/441 |
| 6,294,990 B1 | 9/2001 | Knoll et al. |
| 6,310,544 B1 | 10/2001 | Cohen |
| 6,382,127 B2 | 5/2002 | Wehner |
| 6,600,409 B2 | 7/2003 | Cohen |
| 6,778,095 B2 | 8/2004 | Lo |
| 6,888,448 B2 | 5/2005 | Sandberg et al. |
| 6,925,959 B2 | 8/2005 | Wehner |
| 7,219,001 B2 | 5/2007 | Donar |
| 7,262,689 B2 | 8/2007 | Kolpasky |

OTHER PUBLICATIONS

"Abstract of Japanese Publication JP403266729A; pub. date—Nov. 27, 1991".

"Abstract of Japanese Publication JP402254040A; pub. date—Oct. 12, 1990".

"Abstract of Japanese Publication JP402241842A : pub. date—Sep. 26, 1990".

"Abstract of Japanese Publication JP363139210A; pub. date—Jun. 11, 1988".

"Abstract of Japanese Publication JP02001021573A; pub. date—Jan. 26, 2001".

"Abstract of Japanese Publication JP403276836A; pub. date—Dec. 9, 1991".

* cited by examiner

PIT ROAD DISPLAY

This application is a continuation of U.S. patent application Ser. No. 12/216,933, filed Jul. 14, 2008, and claims the benefit of provisional U.S. Patent Application Ser. No. 61/064,662, filed Mar. 19, 2008.

BACKGROUND OF THE INVENTION

1. Field of the Invention

This invention relates to instruments or gauges for us in vehicles, and in particular to instruments or gauges that provide feedback detectable by the peripheral vision of a driver when vehicle operating parameters, such as engine speed, temperature, pressure, and voltage, are in a critical range. The instruments or gauges of the invention are especially suitable for use in racing vehicles that meet standards of the National Association for Stock Car Auto Racing (NASCAR), although they may also be used in other types of racing and non-racing vehicles.

The instruments or gauges of the invention may include one or more of the following types of instruments or gauges and/or features:

- a. A tachometer that not only includes a primary numeric display, but also a secondary display made up of a plurality of discrete lights of different colors, the colors indicating whether the engine speed of a vehicle is within a relatively narrow range of engine speeds acceptable for the roadway leading from a race track to service areas, known as "pit road," the high and low limits of the range being adjustable to meet pit road requirements at different tracks;
- b. An instrument or gauge having a background that illuminates to indicate critical sensor readings;
- c. An instrument or gauge having improved handling of sensor abnormalities to prevent false readings;
- d. A non-linear analog gauge for a motor vehicle, such as an oil pressure, temperature, or voltage gauge, having a higher resolution in a particular range of interest, and a lower resolution outside that range;
- e. A boost pressure gauge that facilitates entry of gear information for use in traction control; and
- f. A teach and learn feature enabling synchronization of gauges, such as fuel sensors, speedometers, and tachometers, to different sensor inputs.

2. Description of Related Art

The present invention is especially suitable for use in racing vehicles that meet standards of the National Association for Stock Car Auto Racing (NASCAR). Vehicles that comply with the standards set by NASCAR are modified production automobiles that have been stripped of non-essential devices and instruments in order to reduce the weight of the vehicles, and to make room for specialized safety equipment and devices necessary to operation of the vehicle at very high speeds. The nature of NASCAR racing, and in particular the high speeds and close proximity at which the vehicles are driven, requires the driver to devote maximum attention to the track and other vehicles, since any lapse in attention can have catastrophic consequences.

A. The Pit Road Problem

One of the instruments that is typically removed from a NASCAR racing vehicle is the speedometer. Generally, race car drivers seek to drive as fast as possible, and therefore do not require a speedometer. However, one area where more precise speed control is essential is "pit road," which is the roadway leading from the track to individual pit areas where cars are serviced during a race. Because their vehicles lack a speedometer, drivers must rely on the tachometer to control the speed of the vehicle. This results in the problem that the driver must divide attention between the roadway and the tachometer.

Conventional tachometer displays are extremely difficult to follow solely through peripheral vision, and since the penalties for exceeding the pit road speed limit for a particular track are severe, drivers tend to drive at an engine speed that is lower than optimal, causing the driver to risk loss of position in a race by prolonging the time spent off the track in the pit area. If the driver attempts to keep the engine speed closer to the pit road limit by spending more time observing the tachometer, the driver risks running into a vehicle entering pit road from one of the pit areas. These problems are compounded by differences in the permitted speed for different tracks, which depend on the configuration of the pit road and local conditions, and also because the relationship between vehicle and engine speed can vary, necessitating that a certain "fudge" factor be built into the engine speed calculations, making it even more difficult for the driver to control engine speed by "feel" rather than by observing the tachometer.

To solve this problem, the invention proposes to use the "secondary display" of a conventional racing tachometer to provide an indication of engine speeds that can be monitored through the peripheral vision of a driver in order to determine when the engine speed is approaching the pit road maximum, and which furthermore may be adjusted for different tracks and conditions. The "secondary display" of a racing tachometer is an array of multicolored LEDs that typically is progressively illuminated as a driver approaches a shift point, in order to assist the driver in determining the optimal engine speed at which to change gears. The present invention modifies the conventional secondary display to operate at engine speeds lower than those including shift points, and further by making the range of indicated engine speeds adjustable to account for different tracks and pit road conditions.

B. The Hazard Alert/Warning Problem

Another problem addressed by the present invention is the problem of alerting the driver to conditions that require immediate attention. During a race, safety hazards, such as damage to a vehicle caused by flying debris, can arise very suddenly and require an extremely short reaction time on the part of the driver. As a result, instruments and gauges are required to clearly indicate when a parameter has become critical. Conventionally, this is accomplished by providing red and green LEDs on the instrument or gauge to indicate critical conditions. However, the visual distractions and noise that occurs during normal racing are such that the driver may not notice the conventional warning in time to take action. Furthermore, problems that have about to become critical may only be indicated by the conventional analog display, which is difficult to read without in fine enough detail to indicate the developing hazard. As a result, extra measures are required to bring a potential hazard to the attention of the driver, and also to enable the driver to more easily determine whether a hazardous condition is developing.

The present invention addresses this problem in two ways. The first involves utilizing background lighting for the face of the instrument, and preferably flashing of the background lighting, to more visibly indicate hazards and potential hazards. The second, which may be referred to as the "non-linear" gauge solution, involves modifying analog gauges of various types to have different resolutions, with a higher resolution in the range of particular interest to the driver. According to the non-linear gauge solution, the scale of the analog gauge, i.e., the distance on the gauge that indicates a unit of the parameter being measured, is increased in the range of interest, so that the driver can more easily track small changes in the parameter that might indicate a potential hazard.

C. The False Alarm Problem

In order to avoid false alarms, it is conventional for an instrument with a hazard indicator provide an indication of sensor malfunction due to loss or interruption in a sensor signal. To prevent false alarms, it is also conventional to delay the hazard indication for a predetermined time or predetermined number of samples after a sensor indicates a potential hazard. After the predetermined time or number of samples, the sensor is considered to be defective and an indication thereof is provided to the driver. However, if the delay time is too great, the driver may not be given adequate notice of the loss of a sensor, while if the delay time is too short, false alarms may still occur.

The present invention addresses this problem by reducing the number of samples required for shutdown and at the same time adding an immediate start-up or reset function that deactivates the defective sensor indication as soon as a signal from the sensor is received.

D. The Boost Pressure/Traction Control Problem

At low speeds, it is desirable to limit the boost function of a turbo charger by reducing boost pressure, so as to prevent spinning of a vehicle's wheels from excess turbocharging. However, since the tachometer and manifold absolute pressure (MAP) inputs to the conventional boost controller do not provide a clear indication as to what gear the vehicle is in, automated traction control adapters are conventionally complicated and expensive.

The present invention solves this problem by adapting a boost pressure gauge to enable manual setting of engine speed and MAP setpoints, that can be used to limit boost pressure at low speeds. In particular, the invention provides a procedure by which a driver presses a button or buttons on the gauge to establish engine speed and MAP setpoints when certain engine speeds are reached, the setpoints being used to limit boost and thereby provide traction control in lower gears, and a tachometer adapted for such input.

E. The Gauge Synchronization Problem

This problem results from the fact that different sensors have different outputs. For example, fuel level sensors use different resistances to indicate different fuel levels. As a result, a typical fuel gauge can only be used with a specific type of fuel sensor. The present invention provides a simple way to synchronize or calibrate a gauge with respect to different sensors.

SUMMARY OF THE INVENTION

It is accordingly a first objective of the present invention to provide an instrument or gauge for a vehicle that provides critical information to a driver through peripheral vision, so to minimize the need for the driver to turn attention away from the raceway, track, or road.

It is a second objective of the invention to provide an instrument or gauge for a vehicle that provides a rapid indication of sensor loss with a minimum of false indications.

It is a third objective of the invention to provide an analog instrument or gauge for a vehicle that provides higher resolution for operating parameters of greatest interest.

It is a fourth objective of the invention to provide an instrument or gauge that meets the above objectives in the context of a racing vehicle, and in particular a racing vehicle that meets NASCAR specifications.

It is a fifth objective of the invention to provide a tachometer that provides an adjustable range of indications suitable for enabling a driver to maintain optimal engine speed when in the pit road of a raceway.

It is a sixth objective of the invention to provide a tachometer that facilitates setting of setpoints for use by a turbo boost controller in order to provide adaptive traction control.

It is a seventh objective of the invention to provide a teach and learn feature that provides simple way to synchronize gauges to sensor inputs, thereby increasing the versatility of the gauges.

It is an eighth objective of the invention to provide methods of meeting the above-objectives using the instruments or gauges of the invention.

According to one aspect of the present invention, a tachometer display of the type currently used to indicate shift points is programmed to also function as a pit road display. In an especially advantageous embodiment of the invention, the pit road display uses progressive illumination of individual tri-color lighting elements to indicate when a driver traveling in pit road is maintaining a near optical engine speed, about to exceed the maximum engine speed, or substantially below the optimal engine speed, thereby enabling the driver to maintain an engine speed that is close to the pit road speed limit without having to turn away from the road and compromise safety or risk penalties for exceeding the speed limit. Preferably, the pit road display is programmable to alter the range of display engine speeds for different raceways.

According to another aspect of the present invention, the invention provides a secondary warning light arrangement that is more visible to the driver through peripheral vision than conventional secondary warnings, which typically consist of red and green LEDs on the instrument. The arrangement involves backlighting the instrument and illuminating the entire background to alert the driver to a particular reading, such as overheating, loss of oil pressure, or an overvoltage. The backlighting can be caused to flash or remain steady to indicate different levels of alert.

In order to provide the driver with additional information before an operating parameter becomes critical, the invention also provides for varying the resolution on the analog face of the gauge or instruments, so that parameter ranges of particular interest take up more space on the instrument face and are therefore easier for a driver to read.

According to yet another aspect of the present invention, any of the gauges or instruments described above may be programmed to indicate a disabled sensor after a relatively small number of negative samples, and to discontinue the indication whenever a positive sample indicative of a properly functioning sensor is obtained, thereby providing a more rapid indication of sensor malfunction with fewer false indications.

According to a still further aspect of the present invention, the invention provides a modified boost pressure gauge and a convenient method of using the modified gauge to enable a driver to input setpoints used to limit boost pressure and thereby provide adaptive traction control at low speeds based solely on MAP and engine speed inputs.

Finally, according to another aspect of the present invention, the invention provides a teach and learn function that enables a user to easily synchronize a gauge with different sensor inputs. Implementation of this feature involves first causing a sensed parameter to be at a first level and pressing an enter button (or other user input), and then causing the sensed parameter to attain a second level and pressing an enter button or other input. The teach and learn feature can, for example, be used to synchronize a fuel gauge to different fuel sensors, which typically utilize different resistor values, by having the user initially raise the level to full and pushing the enter button, and then lowering the sensed level to a minimum and again pushing the enter button. In addition, the teach and learn feature may be used, by way of example and not limitation, to calibrate a speedometer by pushing an enter button at different known speeds, or to synchronize tach pulses to a tachometer display by running the engine at known speeds and pressing the enter button accordingly.

As indicated above, the instrument panel or display is especially adapted for use in a racing vehicle, and in particular a racing vehicle that meets NASCAR specifications, although many aspects of the invention may have applicability to racing vehicles not limited to NASCAR-rated vehicles or to racing vehicles in general, but rather may also be used for general purpose vehicles, either as original equipment or as add on or replacement gauges or instruments. In addition, the various aspects of the invention may be used separately or, as appropriate, combined in a single instrument, and multiple such instruments may be combined to form an instrument panel or cluster.

DETAILED DESCRIPTION OF THE PREFERRED EMBODIMENTS

Figure 1:
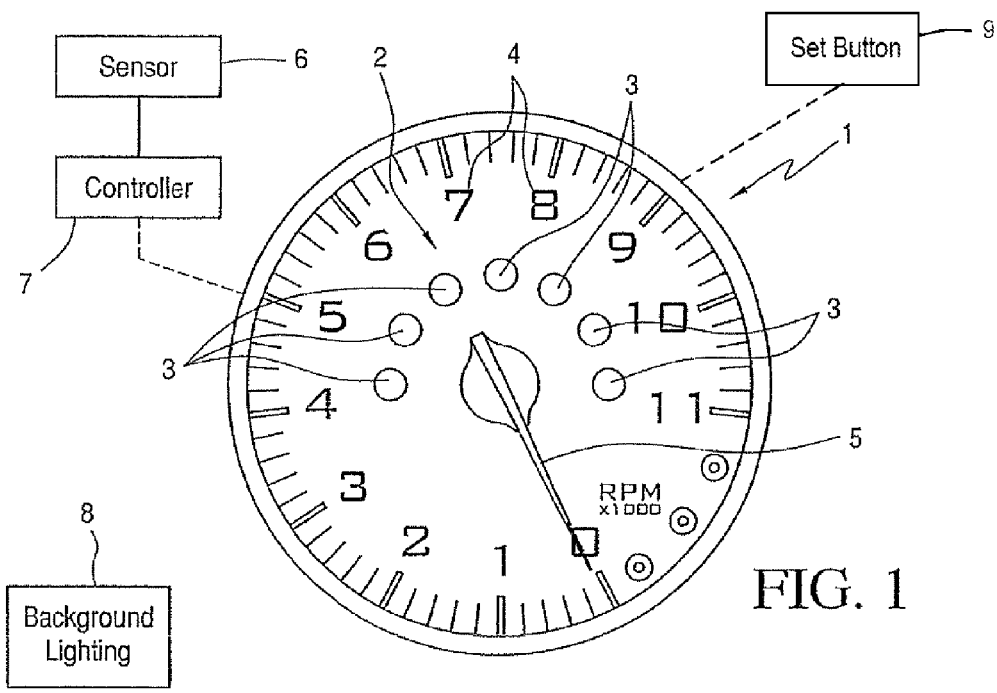
FIG. 1 is a front view of a tachometer having a secondary display, which may be used as a pit road display according to the principles of a preferred embodiment of the invention.

FIG. 1 shows a tachometer 1 having a secondary display 2 that includes seven indicator lights 3 arranged to be successively illuminated in order to indicate shift points. The seven indicator lights 3 are preferably in the form of multi-color LEDs having a brightness sufficient to enable the lights to be seen using the driver's peripheral vision. The lights 3 may be progressively illuminated such that the leftmost light will be illuminated first, followed by the leftmost light and the adjacent light, followed by the leftmost three lights, and so forth until all seven lights are illuminated. This pattern of progressive illumination may be referred to as a progressive illumination sequence. Preferably, three such progressive illumination sequences are provided, including a first in which the lights being illuminated are all green, a second in which the lights being illuminated are all yellow, and a third in which the lights being illuminated are all red. A "set" button 9 is connected to or included in the tachometer for the purpose of establishing setpoints that define a range or band of speeds over which the display is to operate, as described below.

The tachometer also includes primary display that includes a conventional analog faceplate in which the measured parameter, in this case engine speed, is indicated by printed numbers 4 and a mechanical pointer 5. The secondary display may be electronically controlled in response to inputs from one or more sensor(s) 6 and a microcontroller 7 (the sensor(s) 6 and controller 7 being indicated schematically) arranged to determine not only the on/off status but also the intensity and color of each light. The series of lights 3 may be arranged geometrically in a line, arc, circle or other configuration to meet both visibility and aesthetic requirements and the overall geometry of the instrument or gauge. Since the conventional controller already controls the intensity and color of the lights in response to detected engine speed, in order to indicate shift points, the only substantial modification of the conventional controller that is required to implement the principles of the invention is to provide for progressive illumination at adjustable engine speed ranges associated with pit road, which is within the capabilities of those skilled in the art, and therefore the controller circuitry will not be described in further detail herein.

Figure 2:
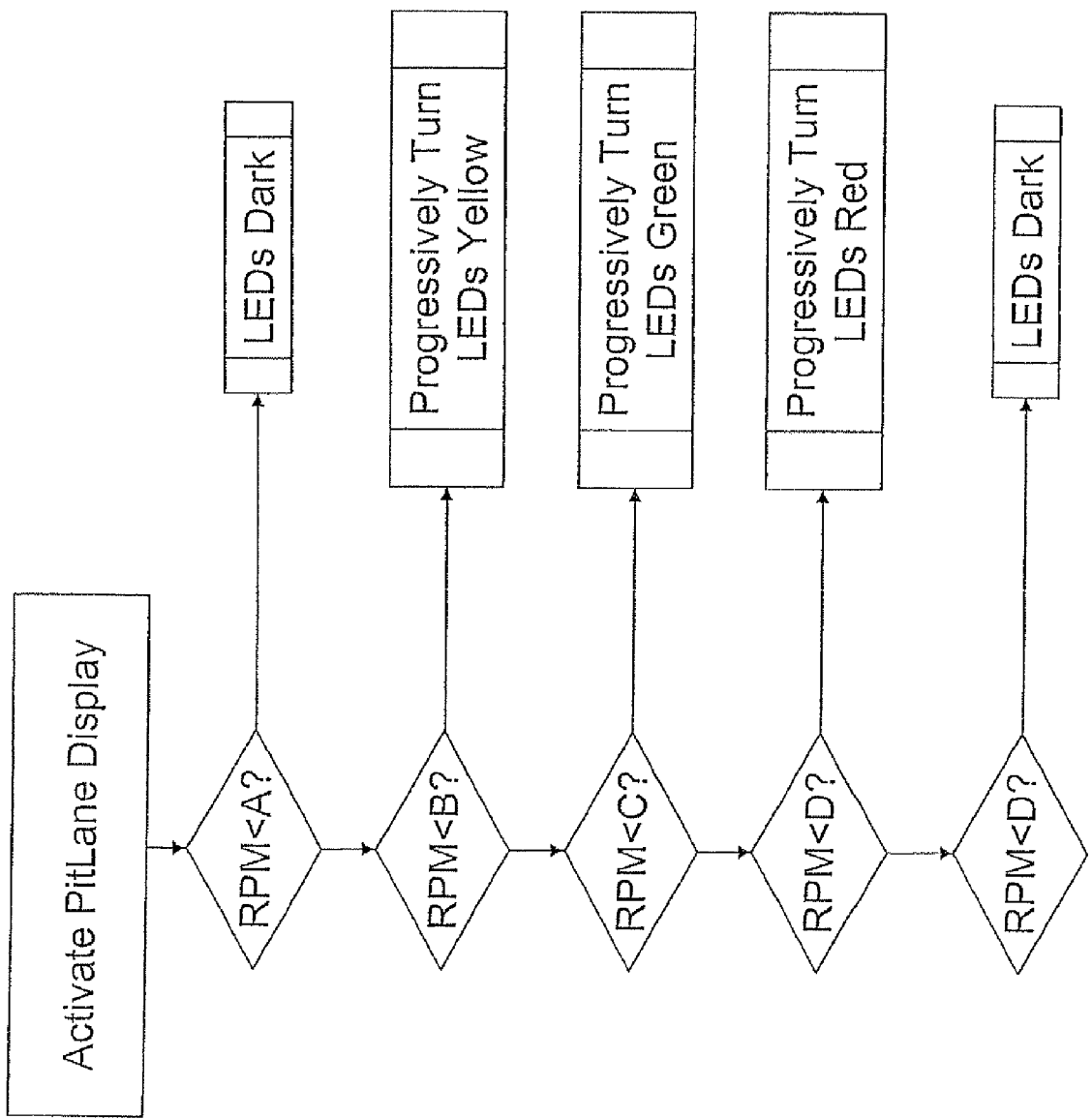
FIG. 2 is a flowchart illustrating operation of the pit road display of a first preferred embodiment of the invention.

As illustrated in FIG. 2, there are four setpoints, which may be labeled A, B, C, and D in increasing order of value. The pit road display is activated upon entering pit road, for example by pushing a button on the display. At actual race speeds, i.e., when the vehicle is on the race track, the pit road display is not needed and the display is instead used in conventional fashion as a shift point indicator. Upon activation, the controller compares the actual engine speed in revolutions per minute (RPMs) with the four setpoints. When the engine speed is below setpoint A, the LEDs are all dark. Above setpoint A, the left-most LED turns yellow. As speed increases, the neighboring LEDs turn yellow in a progressive sequence as described above until, at setpoint B, all the LEDs are illuminated. Immediately above setpoint B, all of the LEDs go dark again and the leftmost LED turns green, followed by illumination of neighboring LEDs in a progressive sequence as engine sped increases until all LEDs are illuminated at setpoint C. The same sequence is then repeated, with a red color, until the engine speed exceeds setpoint D. As a result, yellow lights may be used to warn the driver that the engine is speed is slower than optimal, and that the speed should be increased if possible, while green lights indicate an engine speed that is within a preferred range, and red indicates that the speed limit is about to be exceeded. While all of the LEDs in this example remain dark when the measured quantity is above the setpoint, it is also within the scope of the invention to use a flashing red or other color(s) to indicate an excessive value, and of course to vary the illumination patterns or colors.

Figure 3:
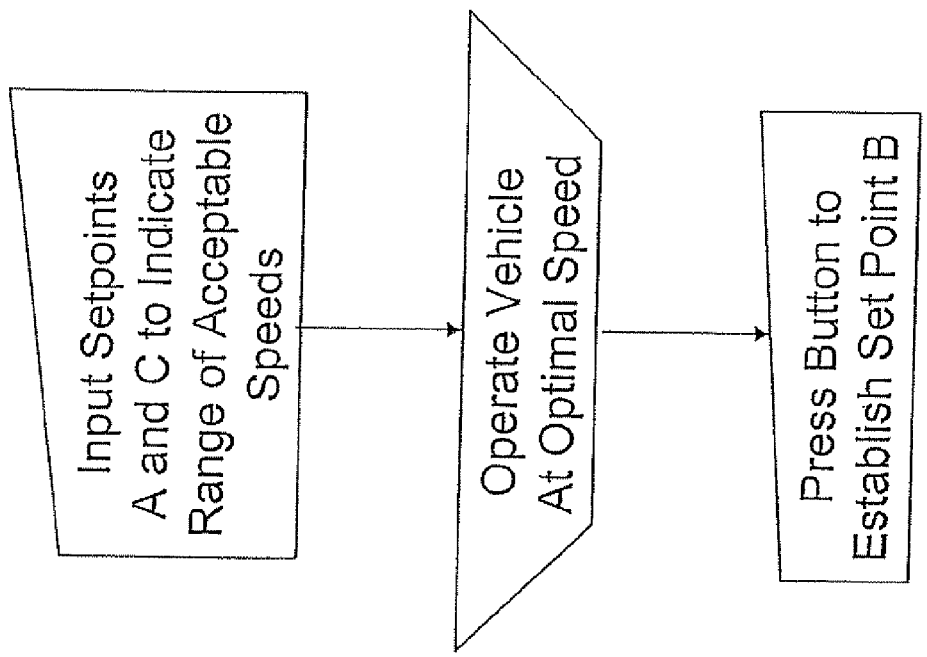
FIG. 3 is a flowchart illustrating programming of the pit road display of the first preferred embodiment for different raceways.

Adjustment of the pit road display illustrated in FIGS. 1 and 2 to accommodate different raceway conditions and requirements may be accomplished by the method illustrated in FIG. 3. According to the illustrated method, the user manually inputs two of the setpoints, for example, by moving the tachometer indicator to a selected lower speed limit and a selected upper speed limit, and pressing a "set" button such as set button 9 illustrated in FIG. 1 to establish setpoints A and C, which defined a range or band of speeds over which the display is to operate, relative to an optimal speed determined in the next step. The vehicle is then driven along pit road at optimal actual speed as determined by an outside observer, and the set button 9 is pressed by the driver while the vehicle is in motion to establish setpoint B, thereby completing programming or setting of the pit road display for a particular track. Setpoint D is automatically established as a fixed amount above setpoint C, based on a predetermined "fudge" factor or cushion that accounts for variations in actual speed relative to engine speed.

Figure 4:
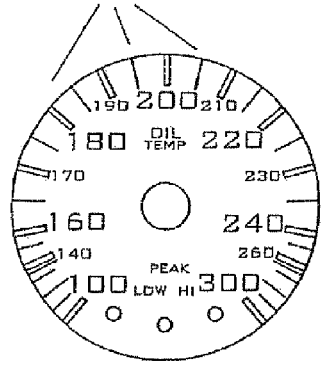
FIGS. 4-9 are front views of various instruments or gauges having non-linear displays according to additional preferred embodiments of the invention.
Figure 5:
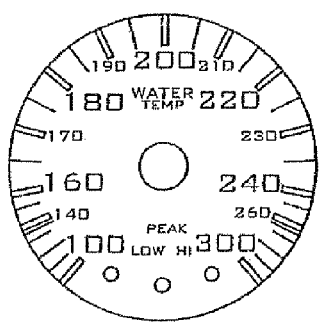
Figure 6:
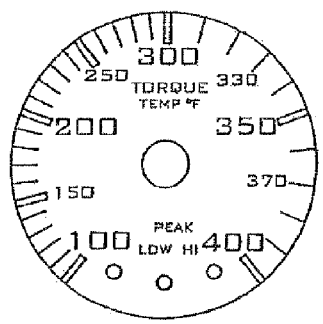
Figure 7:
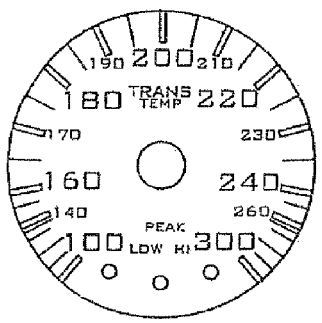
Figure 8:
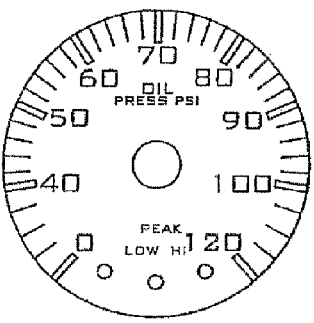
Figure 9:
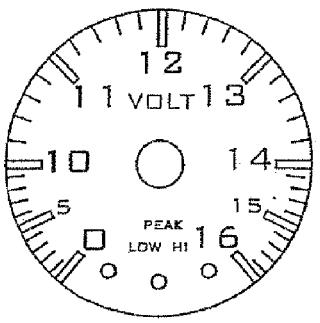

According to another aspect of the invention, illumination means other than and/or in addition to a multiple color secondary display may used to provide notifications and alerts to a driver through the driver's peripheral vision. In particular, background lighting 8 of any desired color may be used to illuminate the entire face of a gauge, as schematically illustrated in FIG. 4, and the background light may be caused to flash, change color, or change brightness/intensity to indicate a particularly critical condition. The use of background illumination or illumination of the entire gauge or instrument to indicate a critical condition may be applied, by way of example and not limitation, to any of the gauges or instruments illustrated in FIGS. 4-9, which include oil, water, torque converter, and transmission temperature gauges (FIGS. 4-7, and oil pressure gauge (FIG. 8), and a voltage gauge (FIG. 9). Setpoints for illumination and/or flashing may be established by pressing "set" buttons or the like upon manually moving the gauge indicator to a desired position.

Figure 10:
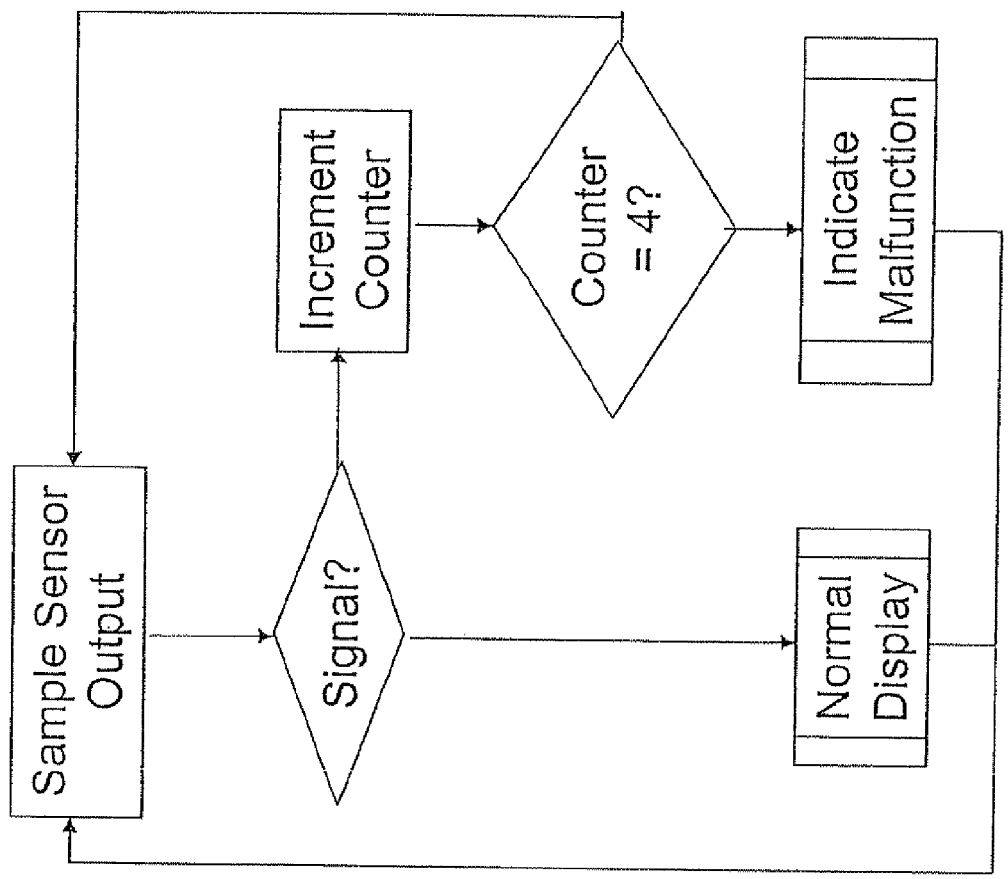
FIG. 10 is a flowchart of a method of indicating sensor malfunctions according to another preferred embodiment of the invention.

According to yet another aspect of the invention, each of the preferred instruments or gauges may also provide an indication whenever a sensor read-out is missing for a predetermined period. In particular, the gauge illumination controller may be arranged to check, as is conventional, a predetermined number of samples before a bad sensor is indicated and the gauge goes off line. However, instead of maintaining the gauge in an offline condition for an indefinite period, the gauge is arranged to go on-line immediately if a sensor signal is received. This is illustrated in FIG. 10, which shows a method that begins with sampling the sensor output and, if a valid signal is received, supplying the signal to a gauge controller for normal display of the parameter represented by the signal being sampled. However, if a signal is not received, then the method loops back to the sampling step, and four samples are taken. If, after four samples, a signal is still not received, then the sensor is deemed to have malfunction and the malfunction is indicated, for example by flashing the background illumination of the gauge. At this time, the gauge continues to sample the sensor output such that, as soon as a valid signal is received, the normal display is resumed. Because the method provides for immediate resumption of the signal, ti is possible to use fewer samples before deciding to indicate a malfunction. For example, instead of sampling eight times, the number of samples taken before indicating a malfunction can be reduced to four. On the other hand, those skilled in the art will appreciate that this number of samples to indicate a malfunction and the number of samples to resume normal operation may be varied. In addition, a different indication may be provided if the malfunction persists for an extended period, such as changing from flashing to steady background illumination or vice versa, or/or changing the color of the background illumination or other indicator.

In addition to optional use of background illumination as a warning or alert, each of the gauges shown in FIGS. 4-9 exhibits a feature that is designed to make it easier to monitor conditions that indicate potential problems, i.e., particular ranges of the parameters being monitor. This feature may be referred to as a "non-linear" or "varying resolution" faceplate or display, in which parameters within a particular range of interest are displayed with a higher resolution than parameters outside the range of interest.

As illustrated in FIGS. 4-9, for readings outside the critical range, the distance between the markings for particular units is reduced and/or markings are deleted, and the pointer or other indicator for pointing to or highlighting markings corresponding to a current value of the parameter therefore passes through a reduced arc for each unit than it does for readings outside the critical range. In the case of oil temperature, for example, temperatures between 160 and 240 degrees Fahrenheit are of particular interest to a driver since these are temperatures that occur during racing, with 240 degrees being an upper limit for normal operation. Therefore, the markings for these temperatures are caused to extend over a 180° arc, with each 10 degrees of temperature being represented by an indicator movement of approximately 10 degrees of arc. On the other hand, temperatures between 100 and 160 degrees Fahrenheit are indicated in one third the arc length, as are temperatures between 240 and 260 degrees, since temperatures below 160 and above 240 are outside those temperatures found during a race. Identical differences in resolution are found on the water and transmission temperature gauges, while the torque converter temperature gauge has a different resolution for temperatures between 300 and 400 degrees than between 100 and 200 degrees, the oil pressure gauge has a higher resolution for pressures between 0 and 40 psi and 40 and 100 psi, and a third different resolution between 100 and 120 psi that is higher than the one between 0 and 40 psi and lower than the one between 40 and 100 psi. The volt meter has a higher resolution between 0 and 10 volts than between 10 and 14 volts, and a third resolution between 14 and 16 volts that is higher than that between 0 and 20 volts and lower than that between 10 and 14 volts.

Those skilled in the art will appreciate that the non-linear faceplate concept may be applied to gauges other than those listed above, and to rectangular or arc-shaped rather than circular gauges. In order to implement the concept, the gauge's indicator motor controller or other mechanism for the moving the indicator needs to be arranged to vary the amount by which the indicator needle moves for each unit change in the parameter being indicated. This can be achieved by those skilled in the art either through motor control software or hardware, or through appropriate gearing.

Figure 11:
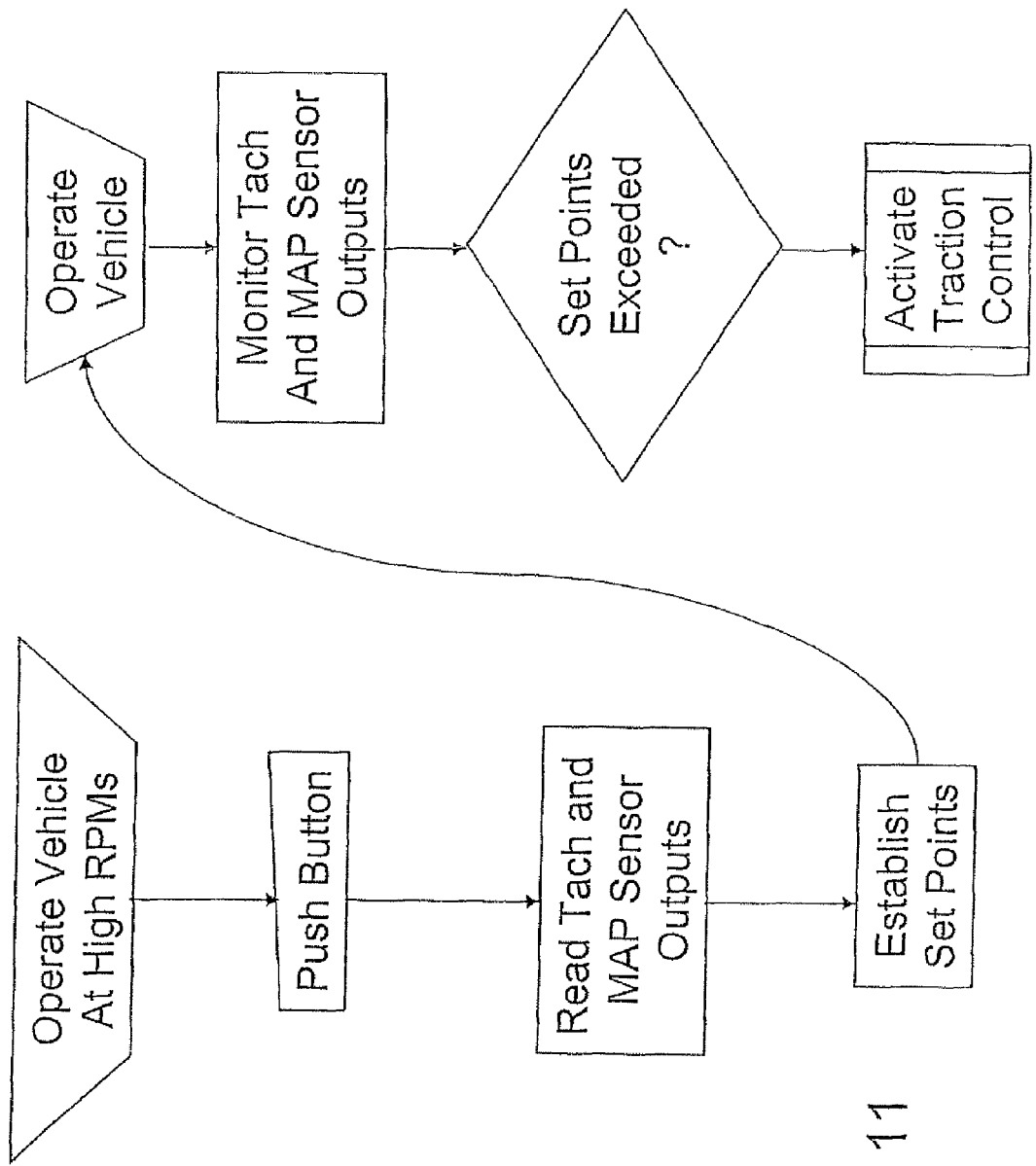
FIG. 11 is a flowchart of a method of using an instrument or gauge to establish setpoints for a boost pressure controller according to yet another preferred embodiment of the invention.

Another feature of the invention is to enable setting of a traction control adapter through the boost pressure gauge that monitors the pressure applied to the wastegate of a turbocharger and therefore controls turbocharger operation. The method correlates tachometer and manifold absolute pressure readings to the gear in which the vehicle is being operated so as to enable use of these readings to limit boost at lower gears, and thereby prevent loss of traction from excess power boost. Rather than direct feedback of gearing, the method illustrated in FIG. 1 permits the user to define gear locations by having the user hit a corresponding "set" button after racing or over-revving the engine in a particular gear to establish setpoints for the tachometer and manifold absolute pressure, the setpoints indicating when loss of traction or tire spin is likely to occur and therefore causing the boost pressure to be limited by operating a boost pressure reducing valve in known fashion. During normal operation of the vehicle, the tachometer and MAP inputs are continuously compared with the previously-established setpoints to determine when to limit boost to prevent tire spin. Those skilled in the art will appreciate that the traction control illustrated in FIG. 11 works on Nitrous Oxide and Boost as well.

A final feature of the invention, which may be included in various gauges described above as well as in gauges lacking other features of the present invention, is a teach and learn function that enables a user to easily synchronize a gauge with different sensor inputs by pushing a programmable input button on the gauge. Such buttons are well known and therefore not described in detail herein, and may take the form of a mechanical button, a switch, a touch input, or any other equivalent input means that causes a signal to be generated when a user performs a specified action (such as pushing a button).

Implementation of the teach and learn feature involves first causing a sensed parameter to be at a first level and pressing the input or "enter" button (or other user input), and then causing the sensed parameter to attain a second level and pressing an enter button or other input. The first and second levels must be verified by observation of the level independent of the reading of the gauge. The teach and learn feature can, for example, be used to synchronize a fuel gauge to different fuel sensors, which typically utilize different resistor values, by having the user initially raise the level to maximum or "full" and pushing the enter button, and then lowering the sensed level to a minimum and again pushing the enter button. In addition, the teach and learn feature may be used to calibrate a speedometer by pushing an enter button at different known speeds determined from outside the vehicle. Finally, the teach and learn button may be used to synchronize tach pulses to a tachometer display by running the engine at known speeds (for example, 2000 RPM as determined by a strobe) and pressing the enter button when the exact speed has been reached.

Having thus described preferred embodiments of the invention in sufficient detail to enable those skilled in the art to make and use the invention, it will nevertheless be appreciated that numerous variations and modifications of the illustrated embodiment may be made without departing from the spirit of the invention. Accordingly, it is intended that the invention not be limited by the above description or accompanying drawings, but that it be defined solely in accordance with the appended claims.

We claim:

1. A pit road display for inclusion in a vehicle, comprising:
    a plurality of lights arranged to be successively illuminated, each of said lights having multiple colors;
    setpoint establishing means for establishing lower and upper setpoints, and an intermediate setpoint indicative of an optimal engine speed; and
    controller means for causing said plurality of lights to be successively illuminated at a first color when an engine speed is between the lower and intermediate setpoints, and to be successively illuminated at a second color when said engine speed is between the intermediate and upper setpoints, said illumination being carried out in a progressive manner, as follows:
        said plurality of lights are dark when the engine speed is below the lower setpoint;
        above the lower setpoint, a first of the plurality of lights is illuminated at a first color;
        as the engine speed increases above the lower set point, neighboring ones of the plurality of lights are illuminated at the first color in a progressive sequence until the intermediate set point is reached, all of the lights are illuminated at the first color;
        upon exceeding the intermediate set point, all of the lights are again dark, followed by illumination of the first of the plurality of lights at the second color and illumination of the neighboring ones of the plurality of lights in a progressive sequence until the upper set point is reached,
    wherein said upper setpoint represents a pit road speed limit and said intermediate set point represents an optimal pit road speed for a particular raceway.

2. A pit road display as claimed in claim 1, wherein said display further includes an additional setpoint, and said controller means causes said plurality of lights to be successively illuminated at a third color when said engine speed is between said upper and additional setpoints.

3. A pit road display as claimed in claim 1, wherein said plurality of lights include a plurality of tri-color LEDs.

4. A pit road display as claimed in claim 1, wherein said plurality of lights are arranged to provide a secondary shift point display when said vehicle is operated at racing speeds.

* * * * *